L. SPARR.
INTEGRATING APPARATUS FOR GRAPHIC INTEGRATION CALCULATIONS.
APPLICATION FILED MAR. 26, 1921.

1,416,519.  Patented May 16, 1922.

Inventor
Lars Sparr
By    atty.

UNITED STATES PATENT OFFICE.

LARS SPARR, OF STOCKHOLM, SWEDEN.

INTEGRATING APPARATUS FOR GRAPHIC INTEGRATION CALCULATIONS.

1,416,519. Specification of Letters Patent. Patented May 16, 1922.

Application filed March 26, 1921. Serial No. 455,956.

*To all whom it may concern:*

Be it known that I, LARS SPARR, a subject of the King of Sweden, residing at Stockholm, Sweden, have invented certain new and useful Improvements in an Integrating Apparatus for Graphic Integration Calculations; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an integrating apparatus, especially adapted for graphically calculating volumes, static moments and the like.

The apparatus is made of a preferably transparent plate, which is divided by parallel lines into strips, the width of which vary in accordance with the mathematical formula, which they are graphically representing.

Figure 1:
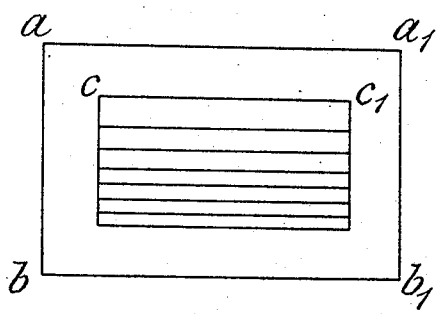
Figure 2:
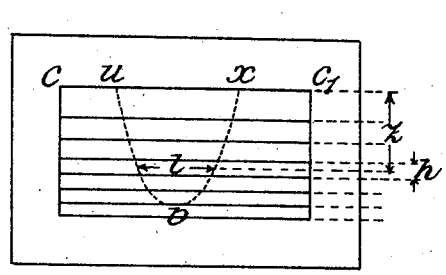
Figure 3:
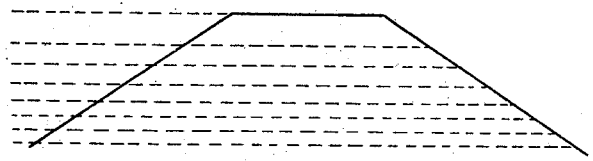
Figure 4:
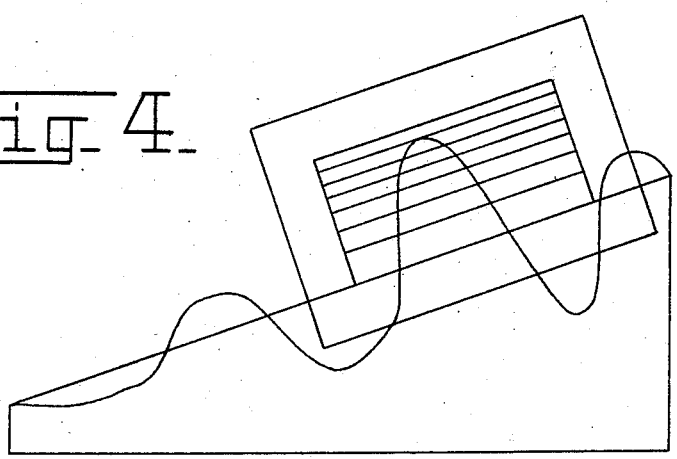

In the accompanying drawings Fig. 1 is a plan view of an executional form of the apparatus, especially designed for graphically calculating volumes, and Figs. 2 and 4 illustrate the use of the apparatus for calculating the volume of a railway embankment of the profile illustrated in Fig. 3.

In the latter figure the cross section of a railway embankment is shown, the corresponding longitudinal section being represented by the curve $u$, $v$, $x$, in Fig. 2, the line $u$ $x$ corresponding to the crown plane of the embankment.

In order to calculate the volume (cubic) of the bank I use my integrating apparatus, a plate $a\ a'\ b\ b'$ (Fig. 1), which when made for this special purpose is divided by parallel lines into strips, corresponding to strips of the cross section of the bank (Fig. 3) of an equal area, containing for instance $a_1$ area unities. The volume of any of the strips will be:

$$v = a_1 l,$$

$l$ being the mean length of the strip.

Provided that the strips falling within the line $u\ v\ x$ (Fig. 2) have the median lengths $l_1, l_2 \ldots l_n$, the volume of the whole bank will be:

$$V = a_1(l_1 + l_2 + \ldots l_n),$$

wherein $a_1$ signifies the unities contained in any or each of the strips.

In order to find the volume of an embankment it will therefore be sufficient to cover its longitudinal section with my apparatus, with the line $c\ c'$ covering the crown line $u\ x$ of the bank, and to measure the length of the strips with any suitable measuring apparatus, as compasses, measuring wheels or the like. The sum total of the strip lengths multiplied with the number of area unities contained in an individual strip will then give the total volume (cubic) of the embankment.

In Fig. 4 is illustrated the utilization of the integrating apparatus in measuring the volume (cubic) of a railway cutting direct from the longitudinal section of the line. If as illustrated the crown plane of the longitudinal section is at an angle with the horizontal, the result must be corrected by dividing with the cosine of the angle, this being suitably made graphically by aid of a profile drawn up on crosslined paper.

It will be clear that my apparatus may be adapted to any graphical integral calculating, in which the integral is a function of the length of the individual parallel strips in which the face of the apparatus is divided, falling within the space to be calculated, as for instance for calculating the static moment of an area or a volume.

Referring again to Fig. 2 and assuming that the static moment of the area $u\ v\ x$ is to be calculated, we have the following relations:

$$m = lhz,$$

$m$ being the moment of the strip in relation to the axis $u\ x$, $l$ the length of a strip, $h$ its width and $z$ its distance from its axis $u\ x$.

If $l$ is chosen equal to 1, the moment of the length unity of the strip will be:

$$m_1 = hz,$$

and the moment of the whole area will be:

$$M = m_1(l_1 + l_2 + \ldots l_n),$$

provided that the length of the individual strips are $l_1, l_2 \ldots l_n$ and their respective widths are chosen in such way as to make the length unity of the strip contain $m_1$ moment unities.

The moment of the whole area $u\ v\ x$ is obtained by placing the integrating disc $a\ a'\ b\ b'$ above this area $u\ v\ x$, measuring the lengths of the individual strips and multiplying the total length found with the value of $m_1$. This may be done very easily, if $m_1$ is given a value of for instance 10, this number representing then the constant of the apparatus.

As will be seen the characteristic feature of the apparatus is that there is provided a series of parallel strips, the individual widths of which are chosen in such way that the integral sum to be calculated is a direct function of the lengths of said strips falling within the area to be calculated and may be found by simply adding up said lengths.

Claims:—

1. Integrating apparatus for graphic integration calculations, comprising a plate and a series of parallel strips on said plate, the individual widths of which are chosen in such way that the integral sum to be calculated is a direct function of the lengths of said strips falling within the area to be calculated and may be found by adding up said lengths.

2. Integrating apparatus for graphic integration calculations, comprising a transparent plate and a series of parallel strips on said plate, the individual widths of which are chosen in such way that the integral sum to be calculated is a direct function of the lengths of said strips falling within the area to be calculated and may be found by adding up said lengths.

3. Integrating apparatus for graphic integration of volumes comprising a plate and a series of parallel strips on said plate, the individual widths of which are chosen so as to divide the cross section of the body to be calculated in equal areas, in such way that the integral volume to be calculated is found by adding up the lengths of the said strips enclosed between the lines of the corresponding longitudinal section of said body.

In testimony that I claim the foregoing as my invention, I have signed my name in presence of two subscribing witnesses.

LARS SPARR.

Witnesses:
J. RIECK-MÜLLER,
WALFORD ANDERSON.